2,861,048
THIXOTROPIC COATING COMPOSITIONS

Howard J. Wright, David R. McGuire, and Paul F. Westfall, Kansas City, Mo., assignors to Cook Paint & Varnish Company, Kansas City, Mo., a corporation of Delaware No Drawing. Application October 19, 1955
Serial No. 541,508

5 Claims. (Cl. 260—22)

The present invention is concerned with thixotropic coating compositions such as paints, enamels and the like.

It has previously been proposed to make thixotropic vehicles for paints and related coating compositions by reacting high molecular weight polyamide resins (molecular weight around 3000 to 9000) and certain ester bodies, such as alkyd resins, at temperatures above the melting point of the polyamide and below 600° F., generally within the range of 430° F. to 500° F. However, there have been a number of disadvantages associated with these prior procedures. For example, it is extremely difficult to consistently obtain a uniform reaction product. This is due, among other reasons, to variations in the characteristics of the polyamide starting material and the necessity of carefully controlling and correlating the conditions of temperature and time which are utilized in reacting the polyamide with the ester body. This lack of uniformity shows up to a significant degree as either (1) undesirable lumpiness which cannot be satisfactorily eliminated, even with extensive stirring, to give a smooth flowing product or (2) a product which does not gel properly. Other disadvantages include difficulty in making a satisfactory thixotropic vehicle in odorless thinner, loss of thixotropic properties (thinning out) as the ambient temperature goes above 90° F. and relatively slow return (e. g. one hour) to the gelled state after agitation.

It has now been found that the abovementioned disadvantages can be obviated to give highly desirable thixotropic gel products, by (1) using certain relatively low molecular weight polyamides rather than the high molecular weight polymers hitherto proposed and (2) admixing said polyamides with alkyd resins or other conventional paint vehicles at room temperature or slightly higher, i. e., substantially below the melting or softening point of the polyamide. Low temperature admixture of the polyamide and vehicle, as proposed herein is characterized by the fact that desirable gels are produced without any, or substantially any, reaction between the polyamide and the vehicle. In other words, for the purposes of the present invention the polyamide is uniformly dispersed in the vehicle at temperatures which might be considered non-reactive insofar as the dispersed materials are concerned. Hence, the prior art necessity of carefully controlling reaction temperatures and times is eliminated.

Accordingly, the principal object of the present invention is to provide novel coating vehicles and compositions containing same which possess thixotropic properties.

A further object is to make thixotropic vehicles and coating compositions which are free from the disadvantages hitherto encountered.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The foregoing objects are accomplished, according to the present invention, by utilizing as the polyamide resin constituent, the relatively low molecular weight heat reaction product of (a) a mixture of polymeric polyene fat acids, i. e., dimerized and trimerized unsaturated fat acids, (b) an alkylene polyamine having from 2–4 amine substituents and (c) from 20–60% of monomer fatty acid based on the total weight of reactants (a), (b) and (c). Surprisingly, it has been found that the application of heat, or at least any significant amount thereof, is not necessary to give a thixotropic gel product when a polyamide of this type is combined with a paint vehicle. Additionally, it appears that the specified amount of monomer fatty acid makes it possible to control the final characteristics of the polyamide within very narrow limits, thus avoiding any substantial variations therein. It is believed that these two factors, i. e., close control of the polyamide characteristics and a simplification in the conditions used for combining the polyamide with the vehicle make it possible to obtain, for the first time, thixotropic vehicles which consistently form a gel, are free from lumps and otherwise completely uniform.

The monomer fatty acid used to make the polyamides of the present invention can be saturated or unsaturated. If desired, mixtures of two or more such acids may be utilized. Typically suitable acids are long chain fatty acids such as lauric, tridecylic, myristic, stearic, oleic, linoleic, linolenic, ricinoleic, palmitic and glyconic or natural or commercial mixtures of these and others. Particularly desirable are the glyceride oil fatty acids such as the acids of coconut oil, soybean oil, dehydrated castor oil, linseed oil, cottonseed oil, tung oil, sardine oil, menhaden oil and the like.

Except for the inclusion of the designated amounts of monomer fatty acid, the polyamides of the invention can be prepared using the methods described in U. S. Patents 2,379,413 and 2,450,940. Any of the alkylene polyamines and polymeric fatty acids mentioned in these patents are suitable in the present process. Thus, for example, alkylene polyamines having from two to four amine substituents which can be utilized are ethylene diamine, which is preferred, tetramethylene diamine, pentamethylene diamine, hexamethylene diamine, octamethylene diamine, decamethylene diamine, diethylene triamine, triethylene tetramine and the like. If desired, mixtures of any two or more of these amines may be used.

Commercially available polymeric polyene fat acids can be used to produce the polyamides herein described. Generally speaking, these polymeric fat acids are mixtures of dimerized and trimerized unsaturated fatty acids, and they are usually produced from fatty acids containing glycerides of polymerizable fat acids such as peanut, cottonseed, wheat soybean, corn, linseed, tung, dehydrated castor, perilla, conjugated linseed or other oils of the drying or semi-drying type. One such polymeric mixture is that known as "Empol 1022 Dimer Acid" which is made by Emery Industries, Inc., Cincinnati, Ohio. This product is obtained by the dimerization of the linoleic acid available in soya, cottonseed, corn and linseed oils. It has the following characteristics:

Dimer content (determined by molecular distillation) _____ Approx. 85%.
Trimer content (determined by molecular distillation) _____ Approx. 12%.
Monomer content (distillate below 270° C. at 5 mm.) _____ Approx. 3%.
Refractive index at 25° C _____ 1.4919.
Specific gravity at 15.5° C./15.5° C _____ 0.95.
Flash point, °F _____ 530.
Fire point, °F _____ 600.
Viscosity at 25° C. (Gardner-Holdt) _____ Z4.
Viscosity at 25° C., centistokes _____ 10,000.
Viscosity at 100° C., centistokes _____ 100.
Solubility _____ Insoluble in water; soluble in alcohol, ether, Stoddard solvent, benzene, acetone.

As indicated above, the polymeric fat acids which are commercially available generally have small amounts of monomer associated therewith. For the purposes of the present invention, however, this quantity of monomer is negligible and it will, therefore, be appreciated that the range of 20–60% monomer, as required herein, represents monomer added to the dimerized and trimerized product and does not include the minor amounts of, e. g. 3 to 5% monomer which might be inherently associated therewith. In view of the possible incidental presence of monomer in the polymeric fat acids utilized, it may be desirable to add monomer fatty acid corresponding with that from which the polymeric product has been made, although this is not essential.

Broadly speaking, the low molecular weight polyamides of the invention can be prepared by heating the reactants together at temperatures within the range of 120° to 175° C. in an inert atmosphere until the reaction is completed. A reaction time of from 6 to 8 hours is usually sufficient. The reaction can be considered substantially completed when the acid and amine numbers are both less than 5 and preferably substantially lower. A solvent such as xylene or toluene or the like may be used, if desired, to aid in water removal.

It is preferred that the polyamide-forming reaction be effected by gradually raising the temperature within the range stated. However, satisfactory results can also be obtained by keeping the temperature constant, or by carrying out the reaction in two states using a successively higher temperature as proposed in the abovementioned U. S. Patent No. 2,450,940. Atmospheric or superatmospheric pressure can be used but reduced pressure, e. g., 1–10 mms., is preferred.

The amounts of polyamine and polymeric fat acids which are used can be widely varied. It is usually best to use substantially equivalent proportions of the polyamine and polymeric fat acids. However, an excess of either one of these reactants is also satisfactory just as long as the monomer content falls within the range stated above.

As indicated, the polyamides of the invention have a relatively low molecular weight which does not exceed about 1500 and is more generally within the range of 500 to 1500. The exact nature of the present polyamides will vary, dependent upon the relative amounts of polyamine, polymeric fat acid and monomer utilized. For instance, the lower the amount of polymeric fat acid, and the greater the amount of added monomer, the lower the molecular weight of the resulting product. In all cases, however, the polyamides of the present invention are significantly different from the high molecular weight polyamides hitherto utilized as evidenced by the ability of the low molecular weight polyamide resins to be dispersed in paints or vehicles therefor at temperatures substantially below their melting points versus the necessity of reacting the high molecular weight polyamides at high temperatures to effect such dispersion.

As explained above, the low molecular weight polyamides of the present invention can be made into thixotropic products by mixing same at room temperatures (e. g., 20–30° C.) with any conventional paint vehicle either before or after the vehicle has been made up into a paint. Typically suitable paint vehicles are the alkyd resins, e. g., reaction products of polybasic acids and polyhydric alcohols. These may be modified with vegetable oils, fatty acids, rosin or natural and synthetic resins. Examples are the reaction products of tall oil, linseed oil and/or soybean oil with pentaerythritol and phthalic anhydride. Other suitable vehicles are the ester oils, natural or synthetic and varnish ester bodies. Thus, the products obtained by esterification of oil acids, or oil and resin acids with polyhydric alcohols are satisfactory vehicles. These are conventional vehicles for paints within which category are included varnishes, lacquers, enamels, etc. Oleoresinous vehicles comprising dispersions of oil-soluble material or synthetic resins in drying oil are suitable for use. Specific materials capable of functioning as the vehicle are refined soybean or linseed oil; the reaction product of pentaerythritol and linseed fatty acids; the reaction product of dehydrated castor oil, pentaerythritol and glycerine; and rosin-modified phenol formaldehyde resin dispersed in tung oil or linseed oil.

The amounts of polyamide and vehicle which are utilized can be varied within fairly wide limits. Generally, however, from 2 to 15 parts by weight of polyamide, with 10 parts preferred, are admixed with 100 parts of alkyd resin or other vehicle.

One method of preparing a thixotropic vehicle according to the invention, involves dispersing or suspending the polyamide and/or paint vehicle in a suitable solvent or diluent, e. g., mineral spirits, since this makes possible more uniform admixture, particularly if the polyamide is quite viscous. It may be desirable, in some cases, where a solvent or diluent is not used to apply light heat, e. g., up to 75° C. or other temperature substantially below the softening point of the polyamide. Such light heating, however, is not essential and its only purpose is for convenience and speed in obtaining a more uniform admixture of the polyamide and vehicle.

The dispersion of the polyamide in the vehicle can be accomplished by agitating the mixture until the product is free of lumps of undispersed polyamide. This usually takes from 10 to 60 minutes although more or less time than that stated may be desirable in certain cases. The resulting product is characterized by its uniform gel-like nature. It is yellowish in color, flows readily and evenly upon stirring and will return to the gel state in from 10 to 30 minutes, depending on the formulation, as compared to one hour for previous gels. The product may be used directly as the vehicle for paints and like coating compositions or, if desired, it may be further reduced or diluted with mineral spirits or other liquid vehicle.

The invention as described above is further illustrated by the ensuing examples which are given solely for purposes of illustration and are not intended to be in any way limiting.

*Example 1*

300 grams of a mixture of dimerized and trimerized fatty acids (Empol 1022 dimer acid), 150 grams soybean acids and 53.6 grams of an 85% water solution of ethylene diamine were charged into a reaction vessel. The reaction mixture was gradually heated up to 120° C. for one hour and then up to 150° C. in two hours. After two more hours in which the temperature was raised to 170° C., the reaction was completed. The resulting polyamide was a balsam-like material having a softening point of 99.0° C. by the ASTM ball and ring method.

10% of the polyamide, on a solids basis, was added to an alkyd resin solution comprising 40% solids in mineral spirits. The alkyd resin was a 28% phthalic anhydride-soybean oil-pentaerythritol alkyd resin. The resulting reaction mixture was maintained at 75° C. on a water bath for ten minutes, the heat being applied for the purpose of more quickly obtaining a uniform dispersion due to the viscosity of the polyamide. The resulting product was a thixotropic paint or resin vehicle possessing remarkable uniformity.

*Example 2*

A low molecular weight polyamide was prepared as in the manner described in Example 1 using 300 grams of the same mixture of dimerized and trimerized fat acids, 230 grams monomer soya fatty acids and 63.5 grams of an 85% aqueous solution of ethylene diamine. The resulting polyamide had a molecular weight of approximately 900 and a softening point of 100° C.. This polyamide was admixed with an alkyd resin solution comprising 60% non-volatiles in mineral spirits. The alkyd resin was identical to the one used in Example 1. The amount of polyamide added to the alkyd resin solution was 5% on a solids basis.

The resulting mixture was kept at room temperature (25° C.) for a period of sixty minutes with agitation, after which the dispersion was completed. The resulting product was useful as a thixotropic vehicle for paints and like compositions. Equivalent results were obtained by applying gentle heat (75° C.) to the polyamide-alkyd resin reaction mixture for five minutes.

Example 3

Another low molecular weight polyamide was prepared by the procedure given in Example 1, using 674.4 grams of the same dimer and trimer fat acids, 368.4 grams lauric acid and 157.2 grams of the 85% aqueous solution of ethylene diamine. This polyamide had a molecular weight of approximately 950 and was easily mixed with the alkyd resin of Example 1 to form a quick-gelling thixotropic vehicle. Usable thixotropic gels were formed with 3 to 5% of this polyamide. The latter produced a satisfactory gel vehicle at temperatures up to 95° F.

It will be appreciated that various modifications may be made in the invention as illustrated in the foregoing examples. For instance, in lieu of the alkyd resins, any of the other paint vehicles mentioned above may be utilized with substantially equivalent results. Thus, for example, satisfactory results can be obtained using the natural or synthetic soya or linseed oil, the reaction product of ester gum and dehydrated castor oil or that of tall oil and maleic anhydride.

The foregoing examples are illustrative of the preparation of a thixotropic gel-vehicle according to the invention for subsequent incorporation in conventional paints to give a gel product. The feature of dispersing the polyamide resin in a paint vehicle which is already a part of a coating composition, i. e., adding the resin directly to paint, enamel or the like is illustrated by the following:

Example 4

9.5 grams of a low molecular weight polyamide identical with that of Example 1 were added to 500 grams of a conventional high gloss architectural enamel which had the following composition:

|  | Percent |  |  |
|---|---|---|---|
| Pigment | 31.1 |  |  |
| Titanium Dioxide |  | 93 |  |
| Zinc Oxide |  | 57 |  |
| Calcium Carbonate |  | 27 |  |
| Vehicle | 68.9 |  |  |
| Soya Alkyd Resin |  |  | ¹ 83.9 |
| Petroleum Thinner |  |  | 8.6 |
| Driers |  |  | 7.5 |
| Total | 100 | 100 | 100 |

¹ 45% volatile.

After stirring the mixture in a pint can for five to fifteen minutes with gentle application of heat up to 85° C., the polyamide was completely dispersed and a smooth, uniform, thixotropic gel paint resulted. An adjustment of vehicle solids was made by stirring in 7.8 grams of mineral spirits. This same thixotropic gel paint was prepared using more vigorous agitation over a longer period of time at room temperature.

Example 5

In the same manner as described in Example 4, 6 grams of low molecular weight polyamide were added to 500 grams of a conventional satin finish wall paint with the following composition.

|  | Percent |  |  |
|---|---|---|---|
| Pigment | 56.6 |  |  |
| Zinc Oxide |  | 2 |  |
| Titanium Dioxide |  | 35 |  |
| Calcium Carbonate |  | 63 |  |
| Vehicle | 43.4 |  |  |
| Soya Alkyd Resin Solution |  |  | ¹ 73 |
| Petroleum Thinner |  |  | 26 |
| Driers |  |  | 1 |
| Total | 100 | 100 | 100 |

¹ 45% volatile.

After the polyamide was dispersed, 4.9 grams of mineral spirits were added to maintain the vehicle solids balance. This simple mixing procedure provided a lump-free and uniform thixotropic gel paint which had all of the desirable properties of the conventional satin finish wall paint.

Example 6

Using the technique described in Example 4, the following mixture was prepared and resulted in a smooth, uniform, lump-free, easily applied thixotropic gel paint.

5.1 grams of low molecular weight polyamide as in Example 1 and 4.2 grams of mineral spirits mixed with 500 grams of a conventional flat wall paint composed as follows:

|  | Percent |  |  |
|---|---|---|---|
| Pigment | 63 |  |  |
| Titanium Dioxide |  | 31 |  |
| Magnesium Silicate |  | 19 |  |
| Calcium Carbonate |  | 48 |  |
| Aluminum Silicate |  | 2 |  |
| Vehicle | 37 |  |  |
| Soya Alkyd Resin Solution |  |  | ¹ 60 |
| Petroleum Thinner |  |  | 37 |
| Driers |  |  | 3 |
| Total | 100 | 100 | 100 |

¹ 45% volatile.

Example 7

10.2 grams of low molecular weight polyamide as in Example 1 and 5.5 grams of mineral spirits were mixed with 750 grams of a conventional outside white house paint which had the following composition:

|  | Percent |  |  |
|---|---|---|---|
| Pigment | 58 |  |  |
| Titanium Dioxide |  | 12 |  |
| Titanium Magnesium |  | 21 |  |
| Titanium Calcium |  | 42 |  |
| Zinc Oxide |  | 25 |  |
| Vehicle | 42 |  |  |
| Kettle bodied linseed oil |  |  | 35 |
| Refined raw linseed oil |  |  | 40 |
| Drier and mineral spirits |  |  | 25 |
| Total | 100 | 100 | 100 |

The procedure of Example 4 was followed to give a smooth, lump-free, uniform thixotropic gel paint.

From the foregoing, it will be appreciated that the present invention provides a highly advantageous improvement in the preparation of thixotropic gel vehicles and paints. The procedures described herein are substantially simpler and offer greater flexibility and control than those previously available. Additionally, the resulting products demonstrate such unique characteristics as uniformity, little or no tendency to thin out at ambient temperatures above 90° F., suitability for use with odorless thinners, and relatively prompt return to the gel state after agitation.

It will be recognized that various modifications may be made in the invention as described herein without departing from the scope and spirit thereof as set forth in the attached claims wherein we claim:

1. The process for making a thixotropic product which comprises dispersing a polyamide having a molecular weight not in excess of 1500 and comprising the heat reaction product of polymeric polyene fat acids, an alkylene polyamine having at least two primary amino groups, and from 20 to 60% by weight, of the total weight of all ingredients of a long chain monomer fatty acid having at least six carbon atoms, in a paint vehicle selected from the group consisting of alkyd resins, drying oils and resin acid esters at a temperature below the softening point of said polyamide.

2. The process of claim 1 wherein said vehicle is an alkyd resin.

3. The process of claim 1 wherein the polyamide is dispersed in said vehicle at a temperature between 20 and 75° C.

4. The process for making a thixotropic product which comprises dispersing a polyamide having a molecular weight not in excess of 1500 and comprising the heat reaction product of dimerized and trimerized fat acids, ethylene diamine, and from 20 to 60% by weight, of the total weight of all ingredients, of the monomer of said dimerized and trimerized fat acids, in an alkyd resin.

5. The process of claim 1 wherein said polyamide is dispersed in paint comprising said vehicle.

References Cited in the file of this patent

UNITED STATES PATENTS

| | | |
|---|---|---|
| 2,149,286 | Graves | Mar. 7, 1939 |
| 2,379,413 | Bradley | July 3, 1945 |
| 2,450,940 | Cowan et al. | Oct. 12, 1948 |
| 2,663,649 | Winkler | Dec. 22, 1953 |

FOREIGN PATENTS

| | | |
|---|---|---|
| 726,570 | Great Britain | Mar. 23, 1955 |
| 516,107 | Canada | Aug. 30, 1955 |

OTHER REFERENCES

Falkenburg et al.: Oil and Soap, 143–148, June 1945.